US006797949B2

(12) United States Patent
Hashimoto et al.

(10) Patent No.: US 6,797,949 B2
(45) Date of Patent: Sep. 28, 2004

(54) MASS SPECTROMETER

(75) Inventors: Yuichiro Hashimoto, Kokubunji (JP); Hideki Hasegawa, Tachikawa (JP); Takashi Baba, Kawagoe (JP); Akihiko Okumura, Hachioji (JP); Izumi Waki, Asaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 10/288,450

(22) Filed: Nov. 6, 2002

(65) Prior Publication Data

US 2003/0155507 A1 Aug. 21, 2003

(30) Foreign Application Priority Data

Feb. 18, 2002 (JP) ....................................... 2002-039446

(51) Int. Cl.[7] ................................................ B01D 59/44
(52) U.S. Cl. ........................ 250/292; 250/293; 250/299
(58) Field of Search ................................ 250/292, 293, 250/299

(56) References Cited

U.S. PATENT DOCUMENTS 5,399,857 A * 3/1995 Doroshenko et al. ........ 250/292
5,679,950 A * 10/1997 Baba et al. ................. 250/281
6,469,298 B1 * 10/2002 Ramsey et al. ............. 250/292

OTHER PUBLICATIONS

U.S. Pat. No. 4,650,999.
U.S. Pat. No. 4,736,101.
"Analytical Chemistry" 1996, vol. 68, No. 22, pp. 4033–4043.
"Analytical Chemistry" 2001, vol. 73, No. 6, pp. 1270–1276.
"Analytical Chemistry" 2001, vol. 73, No. 15, pp. 3542–3548.

* cited by examiner

*Primary Examiner*—Nikita Wells
*Assistant Examiner*—Anthony Quash
(74) *Attorney, Agent, or Firm*—Antonelli, Terry, Stout & Kraus, LLP

(57) ABSTRACT

There is provided a tandem mass spectrometry that, in a quadrupole ion trap, allows small mass-number product ions to be detected without lowering the sensitivity and the resolution. In the quadrupole ion trap, ions are produced by an ion source. Next, the ions are accumulated within a 3-dimensional quadrupole electric field formed by a pair of endcap electrodes and a ring electrode. Finally, the accumulated ions are isolated and dissociated, then being detected. In this quadrupole ion trap, there are provided a mechanism for introducing a laser light, and a mechanism for generating a supplemental alternating-current electric field at the time of the ion dissociation. Moreover, the direction of the supplemental alternating-current electric field and the introduction direction of the laser light are made identical to each other.

12 Claims, 13 Drawing Sheets

MASS SPECTROMETER

BACKGROUND OF THE INVENTION

The present invention relates to all of the mass spectrometers including a quadrupole ion trap process, such as a quadrupole ion trap mass spectrometer and a quadrupole-ion-trap/time-of-flight mass spectrometer.

As one example of a variety of mass analyzing methods, there exist ion trap mass analyzing methods. The basic principle of a quadrupole ion trap mass analyzing method has been described in U.S. Pat. No. 4,650,999. In the ion trap scheme, an about 1-MHz radio frequency voltage is applied to a ring electrode so as to accumulate ions. Within an ion trap, ions whose mass numbers are larger than a certain value acquire a stabilizing condition, thereby being accumulated. After that, the ring voltage is swept from the lower value to a higher one. At this time, the trapped ions are sequentially ejected from an ion with the smallest mass number. This makes it possible to obtain the mass spectrum. The scheme described in U.S. Pat. No. 4,650,999 however, finds it impossible to differentiate different types of ions whose mass numbers are identical to each other.

In order to improve this drawback, a tandem mass spectrometry in the ion trap has been developed. As one example of the tandem mass spectrometry in the quadrupole ion trap, there exists a collision-induced dissociation method based on the collisions with a bath gas within the quadrupole ion trap. This scheme has been described in U.S. Pat. No. 4,736,101. In the present scheme, ions generated at an ion source are accumulated within the ion trap, then isolating parent ions that have a desired mass number. After the ion isolation, a supplemental AC electric field that resonates with the parent ions is applied between endcap electrodes, thereby enlarging the ion orbits. This causes the ions to collide with the neutral gas filling the ion trap, thereby dissociating and detecting the ions. The resultant product ions exhibit specific patterns attributed to differences in the molecular structures. Accordingly, it becomes possible to differentiate the different types of ions whose mass numbers are identical to each other. In order to dissociate the ions, however, it is necessary to increase the ion trapping potential generated by the ring voltage. In order to increase the ion trapping potential, in turn, it is necessary to set up the ring voltage to a high-voltage. This gives rise to a problem that the product ions with small mass numbers deviate from the stable orbit condition and become incapable of being trapped.

In order to solve the above-described problem in the collision-induced dissociation, a method of performing the dissociation with the use of infrared laser has been disclosed in "Analytical Chemistry" 1996, Vol. 68, page 4033. According to this method, after the ion isolation, an irradiation with $CO_2$ laser is performed from a hole, which is bored in the ring electrode, toward the ion trap's central region. The absorption of the infrared laser light by the ions excites the internal energies, which develops the dissociation of the ions. The present scheme allows the small mass-number product ions to be detected by the quadrupole ion trap mass spectrometer. Boring the hole in the ring electrode, however, disturbs a quadrupole electric field within the ion trap, thereby deteriorating the sensitivity and the resolution. Also, the bath-gas pressure (lower than 0.1 mTorr) within the ion trap, which is needed when using an about 50-W output $CO_2$ laser, does not coincide with the optimum degree of vacuum (about 1 to 3 mTorr) for maintaining the ion trapping efficiency and sensitivity. On account of this, the conventional dissociation using the laser light has found it impossible to perform the ion accumulation and dissociation in the ion trap at the optimum degree of vacuum. Consequently, in the conventional ion trap mass spectrometers using the laser light, there has existed a problem that the ion trapping efficiency and sensitivity are considerably low.

Also, a method of performing the infrared laser irradiation and the application of the supplemental AC voltage between the endcap electrodes has been disclosed in "Analytical Chemistry" 2001, Vol. 73, page 1270. According to this method, the collision-induced dissociation by the application of the supplemental AC voltage and the infrared multiphoton dissociation by the infrared laser irradiation are performed at different points-in-time subsequently to each other. This makes it possible to obtain product ions specific to the respective dissociation methods, thus resulting in an advantage of being able to obtain the complementary information.

Also, a method of simultaneously performing the infrared laser irradiation and the application of the supplemental AC voltage between the endcap electrodes has been disclosed in "Analytical Chemistry" 2001, Vol. 73, page 3542. According to this method, the incident direction of the laser light and the application direction of the resonance voltage are located perpendicularly to each other. The supplemental AC electric field is applied between the endcap electrodes, thereby enlarging a desired ion orbit. This shortens a time-period during which the ion whose orbit has been spread by the resonance will undergo the laser irradiation. In this case, the ion whose orbit has been spread exhibits an effect of suppressing the dissociation. Accordingly, it becomes possible to suppress, in the isolated manner, the dissociation of ions included in a particular mass-number range.

SUMMARY OF THE INVENTION

It is an object of the present invention to provide an ion trap mass spectrometer that allows small mass-number product ions to be detected without damaging the sensitivity and the resolution.

In the mass spectrometer according to the present invention, ions are accumulated within the ion trap. Moreover, light and an AC electric field are applied to the accumulated ions, thereby dissociating the ions. At that time, the direction of the AC electric-field vector to be applied to the ions in a supplemental manner in order to dissociate them and the application direction of the light to be applied thereto in order to dissociate them are made identical to each other. As compared with the prior arts, the present mass spectrometer makes it possible to detect the small mass-number product ions with a higher-efficiency. This, eventually, increases the information amount made available by the present mass spectrometer, thereby enhancing the quality-analysis capabilities and the quantity-analysis capabilities.

Other objects, features and advantages of the invention will become apparent from the following description of the embodiments of the invention taken in conjunction with the accompanying drawings.

DESCRIPTION OF THE EMBODIMENTS (1st Embodiment)

Figure 1:
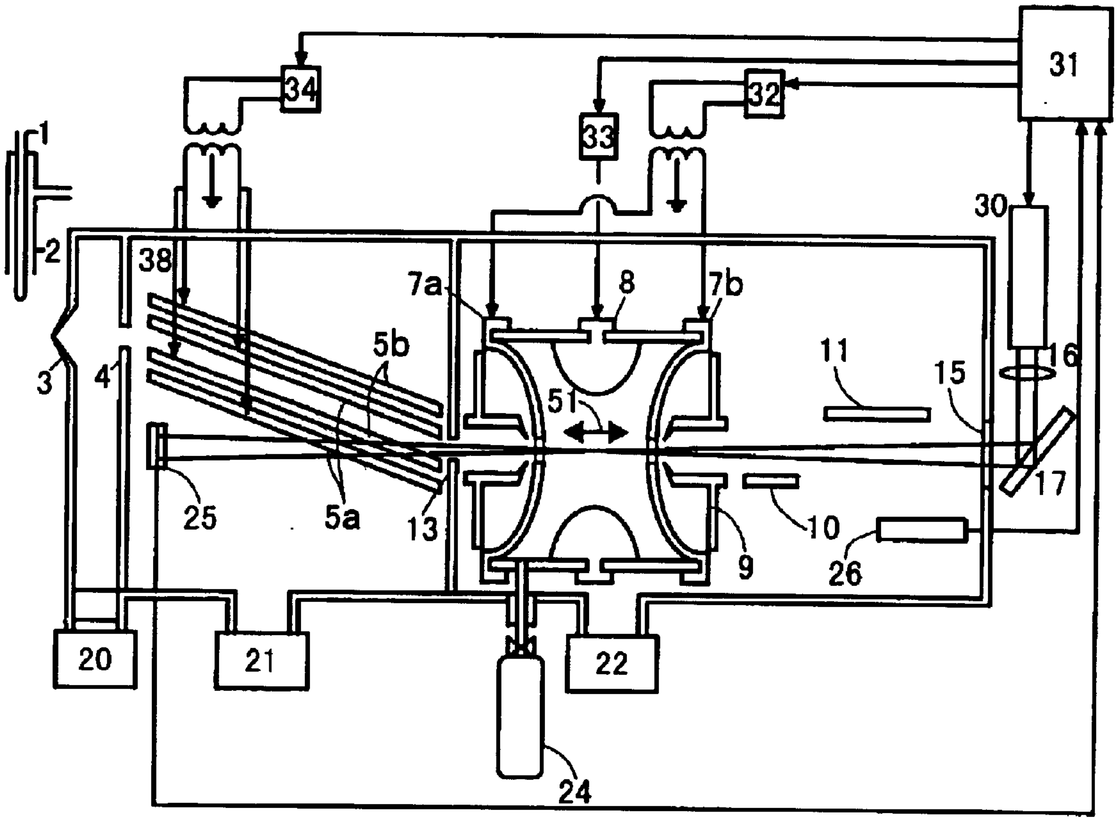
FIG. 1 illustrates a 1st embodiment of the present scheme.

In a quadrupole ion trap mass spectrometer of the present embodiment, it becomes possible to detect small mass-number product ions without damaging the sensitivity and the resolution. This, as compared with the prior arts, enhances the quality-analysis and quantity-analysis capabilities. Hereinafter, referring to the drawings, the explanation will be given below:

FIG. 1 illustrates one embodiment in the case where the present scheme is applied to an atmosphere-pressure ionization ion trap mass spectrometer. Although, in the drawing, there is illustrated the embodiment of an electrospray ion source, the present scheme is also applicable to all of atmospheric pressure ion sources in much the same way. A several-kV high-voltage is applied to an ESI capillary 1, thereby developing an electrospray ionization under the atmosphere pressure. The typical diameter of the ESI capillary is about 0.3 mm in outer-diameter and about 0.15 mm in inner-diameter. If the sample flow-quantity quantity is larger than 20 $\mu$l/minute, an outer tube 2 is further provided around the ESI capillary, thereby making it possible to develop the ionization in a stable manner. Concretely, this is done by, e.g., causing nitrogen gas to flow between the outer tube 2 and the ESI capillary 1.

Ions generated at the ion source pass through an aperture 3, then being introduced into a 1st differential pumping region from which the air has been exhausted by a pump 20. The typical diameter of the aperture 3 is about 0.2 mm, and an about 500-1/minute rotary pump is employed as the pump 20. In this case, the pressure within the 1st differential pumping region becomes equal to about 2 Torr. After that, the ions pass through a 2nd aperture 4, then being introduced into a 2nd differential pumping region from which the air has been exhausted by a pump 21. The hole diameter of the 2nd aperture is 0.4 to 0.6 mm, and the pressure within the 2nd differential pumping region is equal to 5 to 10 mTorr. The pumping speed by the turbo molecular pump 21 is equal to 150 l/s.

In the 2nd differential pumping region, there are located octapoles 5*a*, 5*b* (only 4 octapoles existing on this front side are illustrated) that consist of 8 round cross-section rods. The ions pass through the center of the octapoles. An about 1-MHz and 100-V (0-peak) AC voltage is applied alternately to these electrodes by a RF voltage power-supply 34. The octapoles 5 converge the kinetic energies and the positions of the ions, thus having an effect of transporting the ions with a high-efficiency. On account of this, as illustrated in the drawing, the octapoles can be used when deflecting the ion orbits. After having passed through the octapoles, the ions pass through a 3rd aperture 13, then being introduced into a 3rd differential pumping region.

A turbo molecular pump 22 has exhausted the air from the 3rd differential pumping region. The pumping speed by the turbo molecular pump 22 is about 100 to 200 l/s, and the pressure thereby is about $2\times10^{-5}$ to $1\times10^{-4}$ Torr. After having passed through the 3rd differential pumping region, the ions pass through an inlet gate electrode 6 and an aperture of an endcap electrode 7*a*, then being introduced into a quadrupole ion trap. The quadrupole ion trap includes a pair of mutually-facing cup-configured endcap electrodes 7*a*, 7*b* and a donut-shaped ring electrode 8. The distance between the endcap electrodes is about 10 mm, and the inscribed-circle radius of the ring electrode 8 is about 7 mm. A radio frequency voltage supplied by a power-supply 33 for the trapping RF voltage is applied to the ring electrode 8. This forms a quadrupole electric field in a space sandwiched by these electrodes. The quadrupole electric field thus formed allows the ions to be accumulated or to be ejected selectively. The typical frequency of the radio frequency voltage applied to the ring electrode is 500 kHz to 1 MHz. A gas bottle 24 has fed a bath gas into this space for the purpose of the ion trapping or the like. In order to prevent the bath gas from leaking out to the outside, a shielding has been performed with an insulating material. The introduced bath gas is exhausted out mainly through the apertures of the endcap electrodes 7*a*, 7*b*, thus maintaining the internal pressure at about $10^{-3}$ Torr. The apertures' diameter of the endcap electrodes is equal to about 1 to 3 mm. Although, as the bath gas, the commonly employed gas is He, it is also possible to use Ar, $N_2$, Xe, Kr, the air, or the like. The inert gases and $N_2$ are of a low reactive property, and accordingly have an advantage of being able to trap the ions in a stable manner for a long time. The larger the molecular weight of the employed bath gas is, the greater the effect by the present scheme becomes. Meanwhile, the air has an advantage of being able to directly introduce the outside air without using the gas bottle 24. Moreover, a supplemental resonance voltage supplied by a power-supply 32 for the supplemental AC voltage is applied between the endcap electrodes 7*a*, 7*b*. This makes it possible to spread the orbit amplitude of a particular ion in the endcap electrodes' direction. The voltages generated by the power-supply 32 for the supplemental AC voltage are 1 to 500-kHz frequency AC voltages and a voltage resulting from the superposition thereof. The application of the supplemental resonance voltage causes an electric field to occur which exists in the direction of a supplemental AC electric-field vector 51. Using a commercially-available simulation software or the like, the electric-field vector 51 can be calculated from the configurations of the respective electrodes in the ion trap and the voltage applied between the endcap electrodes 7*a*, 7*b*. In the configuration in FIG. 1, in proximity to the central axis of the ion trap, there occurs the electric-field vector existing in substantially the axis direction.

Furthermore, an infrared laser beam is introduced into the ion trap from an ion-launching hole bored in the endcap electrode 7*b*. The output and the focal-point area of the laser light (the laser power density of the focal-point) are equal to about 10 to 30 W and 0.3 to 2 $mm^2$, respectively. A PC controller 31 performs the control over an infrared laser 30. The laser light launched from the infrared laser 30 is focused by a focal unit such as a lens 16. Next, the laser beam is reflected by a mirror 17 to pass through a window 15, and the laser beam is irradiated from the ion-launching hole in the endcap electrode 7*b*. The lens 16 and the window 15 are formed of a material such as ZnSe for which a 10. 6-mm wavelength $CO_2$ laser exhibits a high transmittance. Concerning the alignment of the laser light, at first, a rough adjustment is made at the mirror 17 so that the laser light will pass through the holes in the endcap electrode 7*a*, 7*b*. The rough adjustment can be confirmed at a photon detector 25. After that, using a sample such as a reserpine ion, the adjustment of the mirror 17 is made so that the dissociation efficiency of the sample will become the maximum. Since the mirror 17 exists under the atmosphere pressure, this operation is simple and easy. The larger an initial beam-width becomes, the more advantageous it becomes to decrease the focal-point area. Accordingly, it is also effective to set up a beam expander between the ion-launching hole and the mirror 17. Aligning the focal-point area so that the beam-spread will substantially coincide with the ion-spread allows the laser's energy to be supplied to the ions with a high-efficiency.

In order to locate the photon detector 25, the octapoles are located obliquely with respect to the laser optical-axis. Although, in the drawing, the laser has been introduced via the lens and the mirror, a mode is possible where the lens and the mirror are omitted. In this case, there exists a merit of being able to reducing the cost of the optical components. The trapped ions, after operations that will be explained later have been performed, are ejected on each mass basis from the aperture of the endcap electrode 7*b*, then passing through an outlet gate electrode 9. Moreover, a deflector 10 deflects the orbits of the ions, thus causing the ions to collide with a conversion dynode 11. At the time of a positive ion detection, a minus several-kV voltage is applied to the conversion dynode, and electrons are generated at the time of the collision. The electrons generated reach a detector 26 to which an about 10-kV voltage has been applied, thereby being amplified and observed as signals. The signals are transmitted to the controller 31, which, then, records the mass spectrum.

Figure 2:
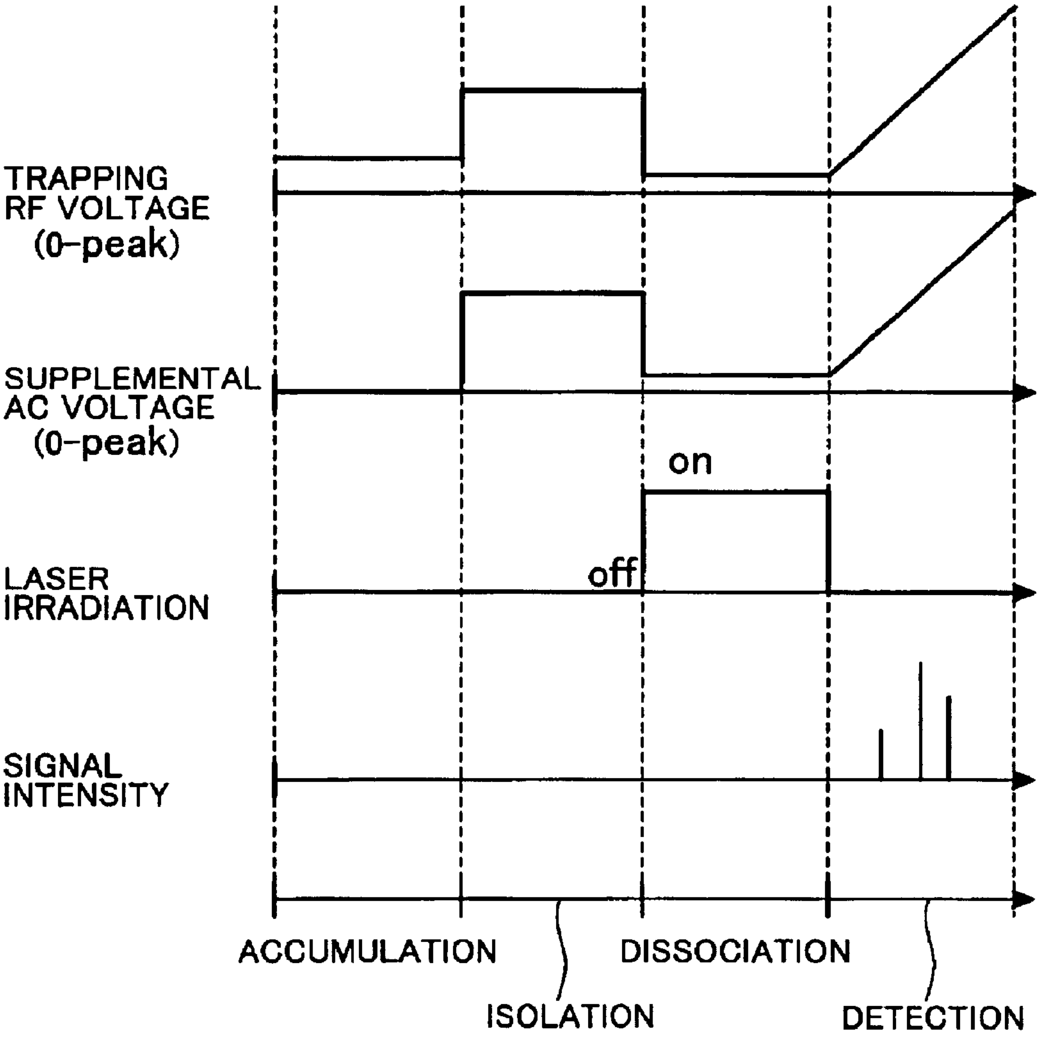
FIG. 2 illustrates measurement sequences in the 1st to a 3rd embodiments.

Hereinafter, referring to FIG. 2, the explanation will be given below concerning the operation method of the ion trap in the case of employing the present scheme. The operation of the ion trap by the present scheme includes the following 4 sequences: The ion accumulation, the ion isolation, the ion dissociation, and the ion detection. The controller 31 controls the trapping RF voltage applied to the ring electrode 8, the supplemental AC voltage applied between the endcap electrodes 7*a*, 7*b*, and the laser irradiation performed by the laser 30. Also, the ion intensity detected by the detector 26 is transmitted to the controller 31, then being recorded as the mass spectrum data.

During the time-period of the ion accumulation, the trapping RF voltage generated by the trapping RF voltage power-supply 33 continues to be applied to the ring electrode 8. During this time-period, the ions, which had been generated at the ion source and have passed through the respective components, are being stored into the ion trap. The typical value of the accumulation time is about 0.1 to 100 ms. If the accumulation time is too long, there occurs a phenomenon called "space charge of ions" within the ion trap. Since this phenomenon disturbs the electric field, the accumulation is terminated before this phenomenon appears. During this time-period, neither the supplemental AC voltage's application nor the laser irradiation is performed.

Next, the trapping RF voltage and the supplemental AC voltage is set up, thereby performing the isolation of desired parent ions that are included in a particular mass range. For example, an electric field, which is implemented by superposing radio frequency components excluding the resonance frequency of the desired parent ions, is applied between the endcap electrodes. This causes ions other than the desired parent ions to be ejected to the outside, thereby permitting only the ions, which are included in the particular mass range, to remain within the ion trap. Although, in addition to this method, there exist a variety of ion isolation methods, an object that is common to all the methods is to cause only a certain range of parent ions to remain within the ion trap. The typical time-period needed for the ion isolation is about 5 to 20 ms. During this time-period, none of the laser irradiation is performed.

Next, the dissociation of the isolated parent ions is performed. During this time-period, if the resultant product ions included in a wide mass range are wished to be detected, the trapping RF voltage is set up to a comparatively low voltage. Also, if stable parent ions are wished to be dissociated, the trapping RF voltage is set up to a comparatively high voltage. With this timing, a several-tens of-mV to several-V supplemental AC voltage that resonates with the parent ions is applied between the endcap electrodes. Also, the irradiation with the laser light is performed during this time-period. The typical time-period needed for the ion dissociation is about 5 to 100 ms. The typical laser power is about 10 to 30 W, and the power density thereof at this time is about 20 to 60 $W/mm^2$ (inaccurate because this is a calculated value).

Finally, the ion detection is performed. During the time-period of the ion detection, the trapping RF voltage is changed from the lower-voltage to a higher-voltage. The product ions are made unstable from the small mass-number product ions, thereby being ejected from the ion trap. Here, the detector detects the ion intensity thereof. Since a certain fixed relationship exists between the trapping RF voltage and the ejected mass, the ion intensity at this time is recorded into the controller as the mass spectrum data.

Figure 3A:
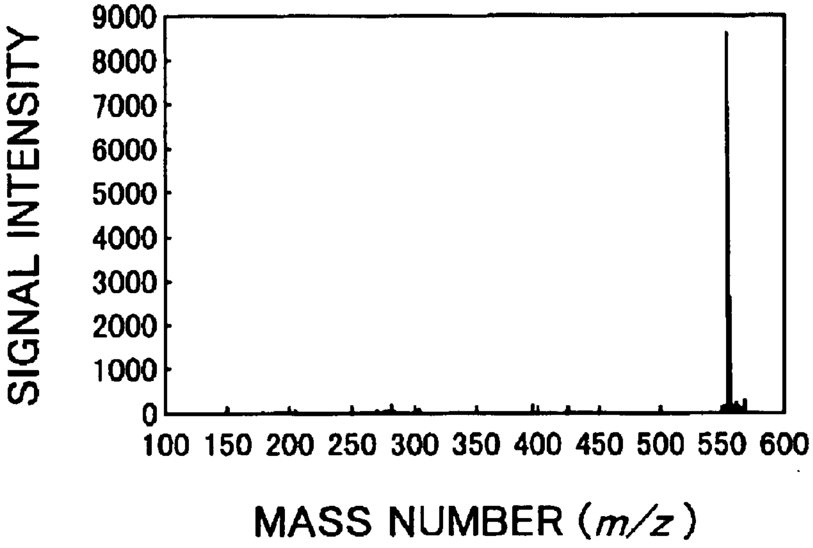
FIG. 3A and FIG. 3B are explanatory diagrams for indicating effects by the present scheme.
Figure 3B:
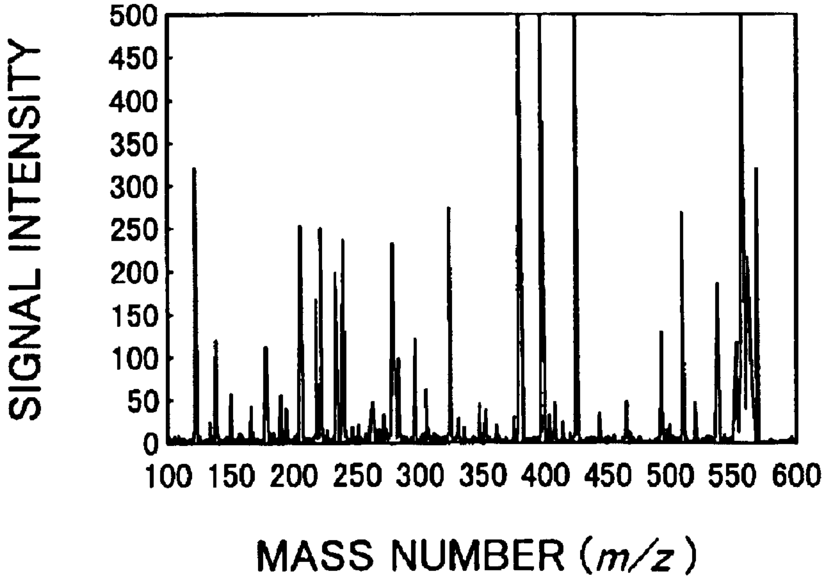

FIG. 3A and FIG. 3B illustrate one example of the mass spectrum obtained by the present scheme. As an analysis sample, leucine-enkephalin has been employed. FIG. 3A illustrates the mass spectrum before the dissociation, and FIG. 3B illustrates the mass spectrum after the dissociation. At this time, the bath-gas pressure within the ion trap is 1.2 mTorr. In FIG. 3A, monovalent positive ions of leucine-enkephalin (the monoisotopic mass number is equal to 556.27) have been selected. As the result of applying the present scheme to this analysis sample, the dissociation spectrum illustrated in FIG. 3B has been obtained. The mass spectrometer according to the present invention allows the small mass-number product ions to be detected with a high-efficiency. Consequently, the present mass spectrometer is particularly effective in the analysis of living-body samples, such as a protein or a peptide, or in the proteome analysis. Moreover, the present mass spectrometer permits a large number of product ions to be obtained in a wide mass-number range, thereby enhancing the identification efficiency of the protein or the peptide as well.

Figure 4:
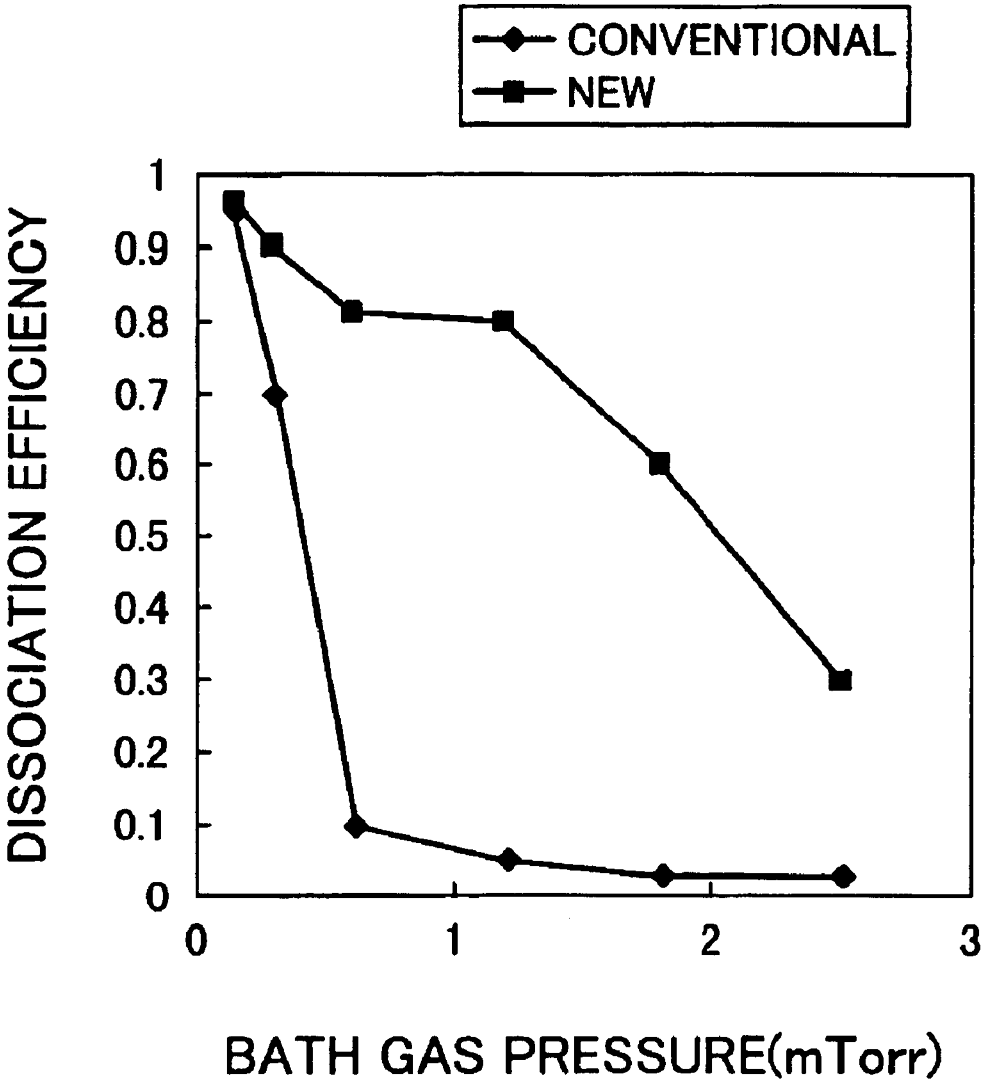
FIG. 4 is an explanatory diagram for indicating effects by the present scheme.

FIG. 4 illustrates the bath-gas pressure dependence of the dissociation efficiency in the present infrared-laser dissociation scheme and that of the dissociation efficiency in the conventional infrared-laser dissociation scheme. In the conventional infrared-laser dissociation scheme, the dissociation efficiency is low at the bath-gas pressure higher than 0.3 mTorr. At the bath-gas pressure lower than 0.3 mTorr, the trapping efficiency by the ion trap is exceedingly lowered, which results in a lowering in the sensitivity. On the other hand, the present infrared-laser dissociation scheme allows a high dissociation efficiency to be obtained at the bath-gas pressure higher than even 1 mTorr. In this way, the present scheme makes it possible to implement the high dissociation efficiency while maintaining the high trapping efficiency.

Figure 5A:
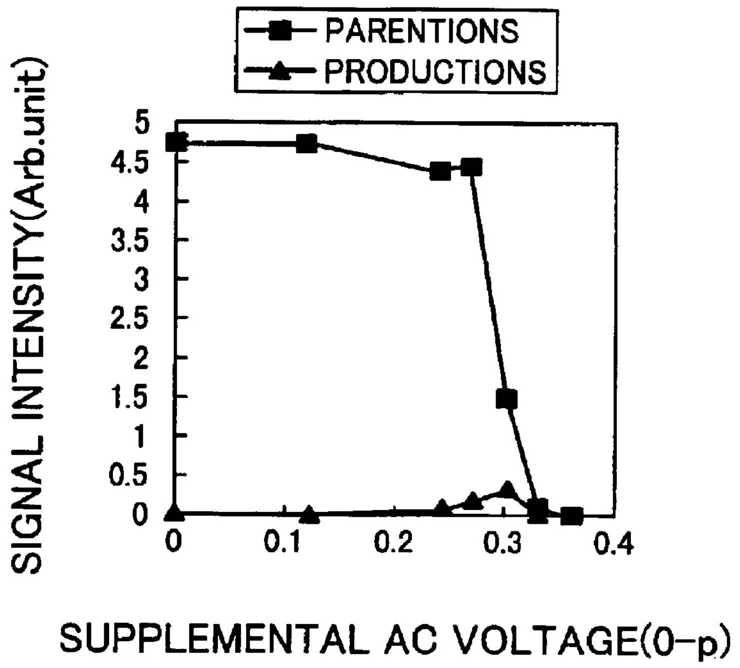
FIG. 5A and FIG. 5B are explanatory diagrams for indicating effects by the present scheme.
Figure 5B:
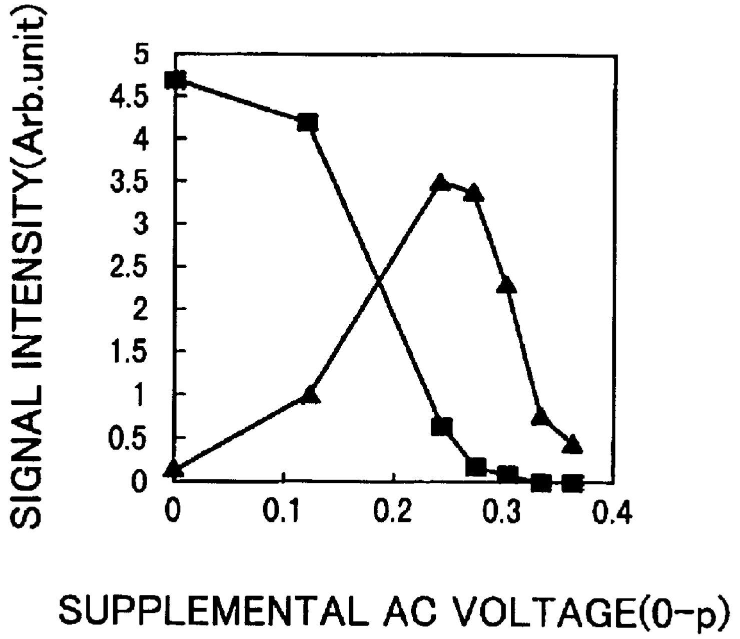

FIG. 5A and FIG. 5B illustrate one example for indicating an activation effect by the present scheme. The present example is of a case where the ring voltage is set up to a condition that the product ions whose mass number is larger than 78 can be trapped ($q_z$=0.12). FIG. 5A represents, when no laser output is performed, the signal intensity of the parent ions and that of the product ions by the supplemental AC voltage value applied between the endcap electrodes. As the voltage applied between the endcap electrodes is increased, the signal intensity of the parent ions starts to be lowered from a value of the voltage, but the product ions are scarcely detected. This means that, before being dissociated, the parent ions have been ejected to the outside of the trap. In this way, in the conventional collision-induced dissociation method, lowering the ring voltage in order to acquire the small mass-number product ions gives rise to no dissociation, but results in the ejection of the parent ions instead. Meanwhile, FIG. 5B illustrates the result of the same representation when the infrared laser irradiation is performed. In the conventional infrared multiphoton dissociation, since none of the supplemental AC voltage is applied between the endcap electrodes, no dissociation is developed under this condition. On the other hand, in the present scheme, the product ions are detected near 0.24 to 0.27 V. These results show that the simultaneous development of the laser irradiation and the collision permits the dissociation to be developed.

Figure 6A:
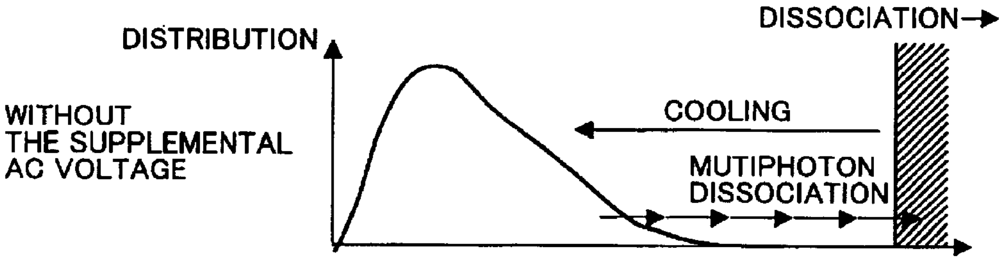
FIG. 6A and FIG. 6B are explanatory diagrams for explaining effects by the present scheme.
Figure 6B:

FIG. 6A and FIG. 6B are explanatory diagrams for explaining the infrared multiphoton dissociation method. The photon energy obtained by the $CO_2$ laser is equal to 0.15 eV, which is small as compared with the typical ion dissociation energy, i.e., several eV. As a result, only after the ions have absorbed a large number of photons to accumulate the internal energies, the ion dissociation is developed. The infrared-laser multiphoton dissociation is considered to be scarcely developed at the bath-gas pressure higher than $10^{-3}$ Torr. This is because the ions have collided with the bath gas before the photon absorption needed for the dissociation is performed. The application of the resonance electric field causes the initial internal-energy distribution to shift to the high-energy side, thereby making it possible to implement the dissociation with a less photon absorption. Since the dissociation reaction and the relaxation/cooling process are competitive reactions to each other, by increasing the laser output by the amount the bath-gas pressure has been increased, it becomes possible to implement the dissociation. This, however, necessitates a several-hundreds of-W output laser, thus resulting in too much cost. The explanation given so far is a one concerning the embodiment in the case where the present scheme has been applied to the electrospray-ion-source ion trap mass spectrometer.

Figure 7A:
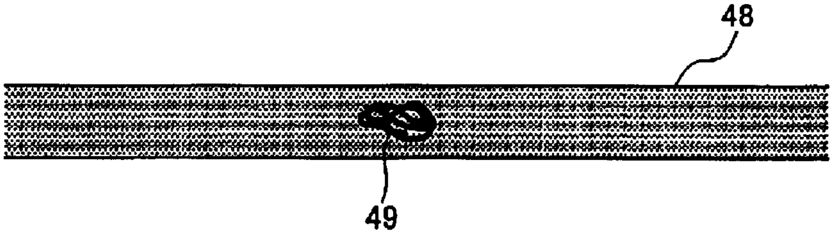
FIG. 7A, FIG. 7B, FIG. 7C, and FIG. 7D are explanatory diagrams for explaining effects by the present scheme.
Figure 7B:
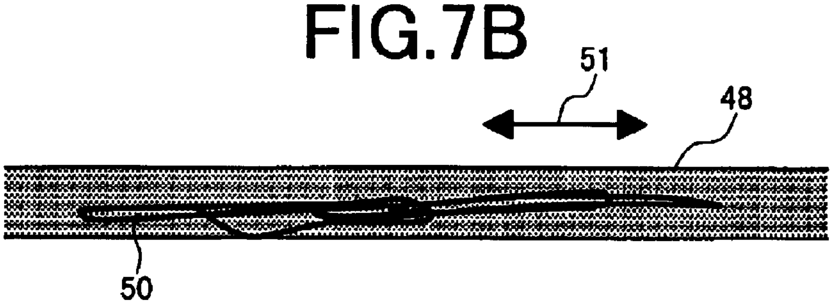
Figure 7C:
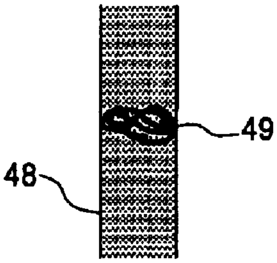
Figure 7D:
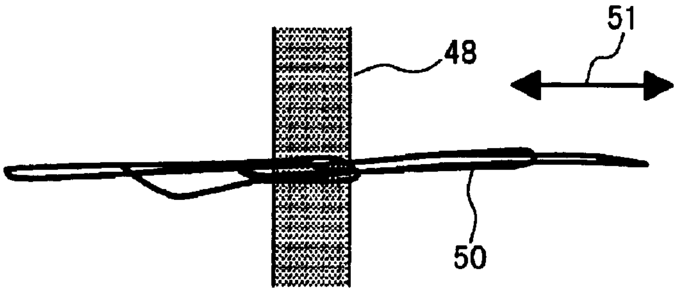

With respect to the direction of the laser flux and that of the supplemental AC electric field according to the present invention, the explanation will be given below concerning a point that differs from the conventional scheme. FIG. 7A, FIG. 7B, FIG. 7C, and FIG. 7D schematically illustrate the relationship between the ion orbits and the laser flux near the center of the ion trap. FIG. 7A and FIG. 7B illustrate the case by the present scheme, and FIG. 7C and FIG. 7D illustrate the case by the conventional scheme. When none of the supplemental AC electric field is applied, in FIG. 7A and FIG. 7C, the ion orbits 49 are focused near the center of the ion trap. When the supplemental AC electric field is applied, in FIG. 7B and FIG. 7D, the ion orbits 50 are spread in the direction of the supplemental AC electric-field vector 51 of the ions. In the case of FIG. 7B in the present invention, since the direction of the laser irradiation and that of the supplemental AC electric-field field vector 51 coincide with each other, the spread orbits 50 exist within the laser flux 48. On account of this, the effect of the laser irradiation and that of the collision produce a synergistic effect. In the case of FIG. 7D in the conventional scheme, however, the spread orbits 50 diverge from the laser flux 48. This weakens the effect of the laser irradiation. In order to implement the present synergistic effect, it is effective that the difference between the direction of the laser flux 48 and that of the supplemental AC electric-field vector 51 falls within a range of 0 to 15°.

Next, the explanation will be given below concerning a concrete voltage set-up method according to the present invention. A pseudo potential $D_z$, and an index $q_z$, for determining the degree of stability of the ions are given by the following expression 1 and expression 2, respectively:

$$D_z = \frac{eV^2}{4mz_0^2\Omega^2} = \frac{q_z V}{8} = \frac{mz_0^2\Omega^2}{16e}q_z^2 \quad \text{(expression 1)}$$

$$q_z = \frac{2eV}{mz_0^2\Omega^2} \quad \text{(expression 2)}$$

where e: elementary electric charge, m: mass, V: ring voltage, Ω: ring-voltage angular frequency, and $z_0$: one-half of endcap-electrodes distance.

Figure 8:
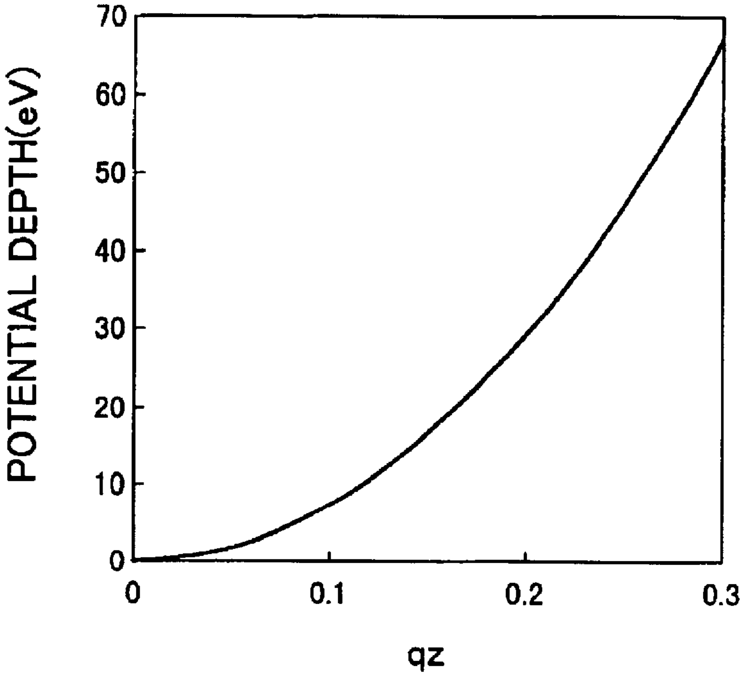
FIG. 8 is an explanatory diagram for explaining a voltage set-up by the present scheme.

FIG. 8 illustrates the potential depth at the time when the mass number is 1000 amu, the ring frequency is 770 kHz, and the endcap-electrodes distance is 14 mm. Detecting small mass-number product ions requires that $q_z$, be made small. However, since the potential well is proportional to the square of $q_z$, a collision cannot be performed which leads to the dissociation if $q_z$, becomes small. Accordingly, from conventionally, it has been considered difficult to acquire small mass number ions as the product ions by using the quadrupole ion trap mass spectrometer. In the present scheme, in order to acquire the small mass-number product ions, the ring voltage V is set up so that $q_z$ becomes smaller than 0.2. At the same time, the ion resonance frequency f is given by the following expression 3:

$$f = \frac{\Omega}{4\pi}\beta(q_z) \quad \text{(expression 3)}$$

Figure 9:
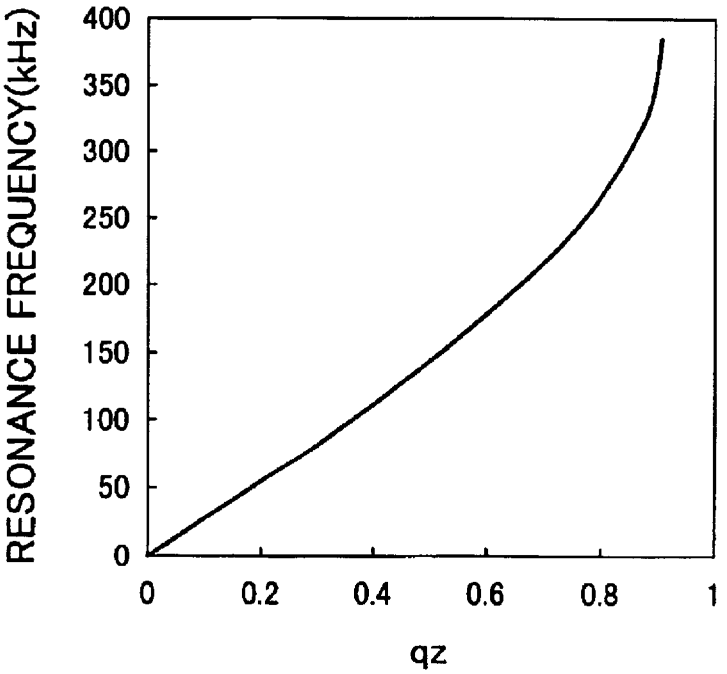
FIG. 9 is an explanatory diagram for explaining a voltage set-up by the present scheme.

When the frequency of the RF voltage applied to the ring electrode is equal to 770 kHz, the resonance frequency is given as is illustrated in FIG. 9. The supplemental AC voltage of this resonance frequency or a frequency in proximity thereto is applied between the endcap electrodes. This may be performed by using a single frequency, or by superposing a plurality of frequencies. The explanation given so far is a one for explaining the occurrence of the present effect.

Also, in an object other than the one of detecting the small mass-number product ions, the present scheme is also effective in, e.g., the dissociation of ions that are impossible to dissociate by the collision-induced dissociation alone. In this case, the ring voltage V is set up so that $q_z$ at the time of the dissociation becomes equal to about 0.2 to 0.4, which is almost the same as in the ordinary collision-induced dissociation.

Also, the peripheral region on the ion trap is heated up so as to raise the bath-gas temperature. This operation enhances this effect even further.

(2nd Embodiment)

Figure 10:
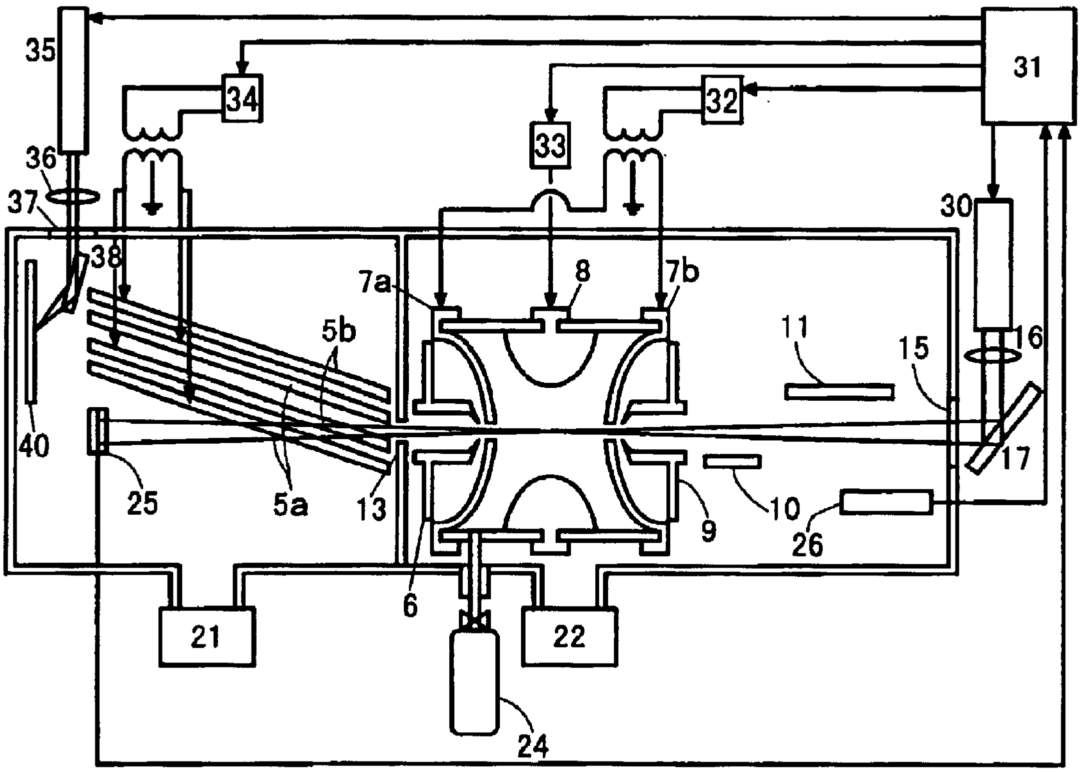
FIG. 10 illustrates the 2nd embodiment of the present scheme.

In a 2nd embodiment, the explanation will be given below concerning an embodiment where the present invention is applied to a matrix-assisted laser-dissociation dissociation ionization ion trap mass analyzing method. FIG. 10 illustrates a schematic diagram of the mass spectrometer in the present embodiment. In the matrix-assisted laser ionization, a laser light from a nitrogen laser 35 passes through a lens 36, and a matrix 40 containing a sample is irradiated with the laser light. Ions thus generated pass through octapoles 5*a*, 5*b*, then being introduced into an ion trap. The dissociation method is the same as the one in the scheme explained earlier. The matrix assisted laser ionization generates larger mass number ions and therefore it is more important to detect the small productions. This fact makes it possible to estimate that the internal-energy distribution of the ions will shift to the higher-energy side. The basis for this estimate is as follows: From the expression 1, the larger the mass number becomes, the deeper the potential well becomes, thereby making it possible to cause the ions to oscillate with the higher-energy. The measurement sequences in this case are also performed as are illustrated in FIG. 2.

(3rd Embodiment)

Figure 11:
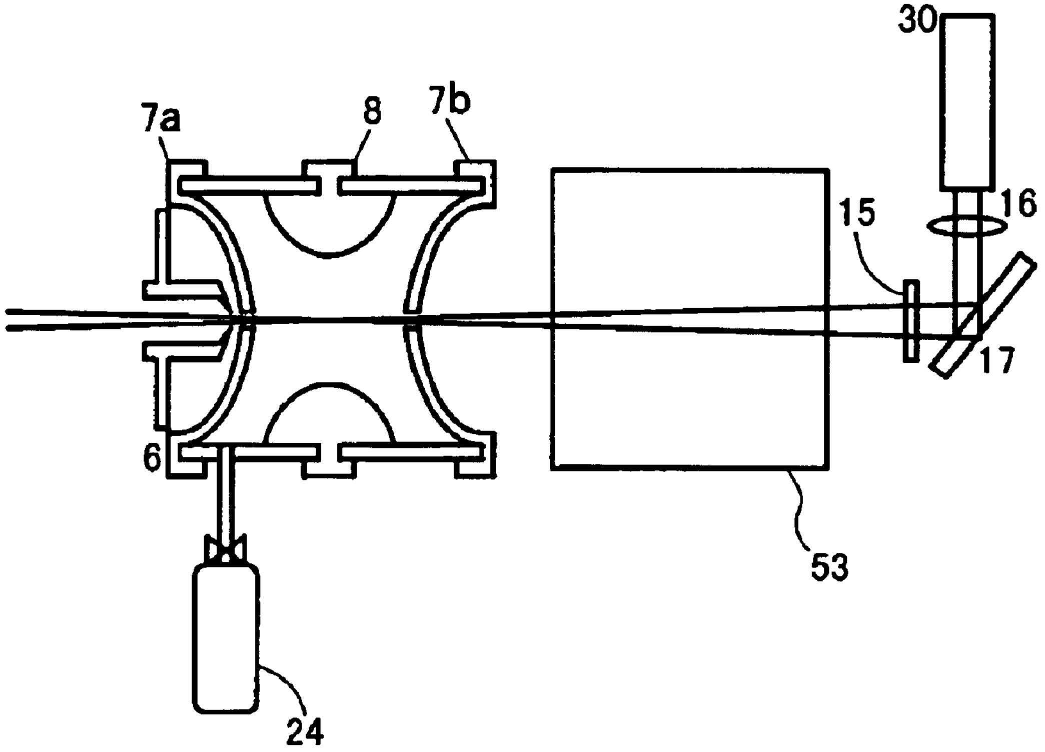
FIG. 11 illustrates the 3rd embodiment of the present scheme.

FIG. 11 illustrates an embodiment where, as a detection scheme of ions the dissociation of which has been performed by the present scheme, the quadrupole mass spectrometer and an ion cyclotron mass spectrometer are connected to each other. After the dissociation has been performed, the ions are introduced into these various types of mass spectrometers so as to be detected. In particular, the ion cyclotron mass spectrometer has an advantage of being superior in the mass resolution and the mass accuracy.

(4th Embodiment)

Figure 12:
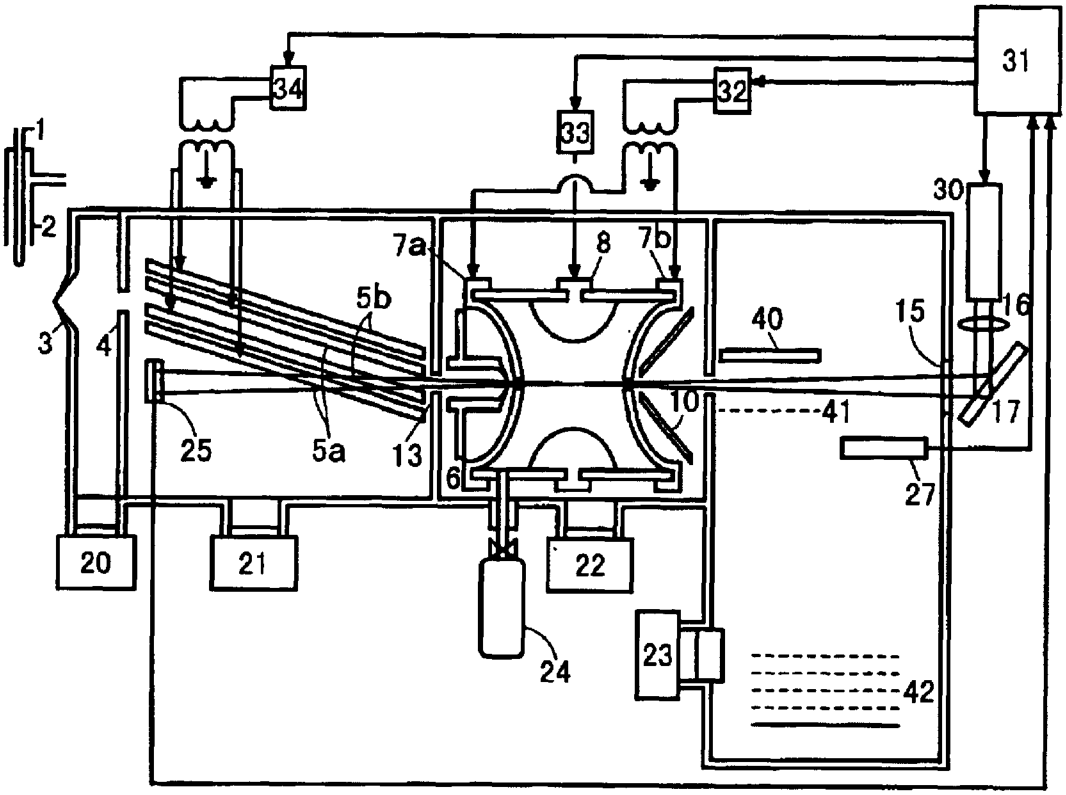
FIG. 12 illustrates a 4th embodiment of the present scheme.

FIG. 12 illustrates one embodiment in the case where the present scheme is applied to an atmospheric pressure ionization ion trap/time-of-flight mass spectrometer. The processes of the ion accumulation, the ion isolation, and the ion dissociation are basically the same as those in the 1st embodiment. In the present scheme, however, the ion detection is performed by the time-of-flight mass spectrometer. The ions, after being dissociated, are transported to a time-of-flight mass spectrometry chamber by applying a several to a several-tens of-V DC voltage between endcap electrodes 7*a*, 7*b*. A several-kV pulse voltage is applied between an acceleration electrode (1) 40 and an acceleration electrode (2) 41, thereby allowing the ions to make a flight in the direction of a reflectron 42. A several-kV voltage is applied to the reflectron 42, which, thereby, pushes back the ions in the opposite direction to allow the ions to reach a detector 27. A high-speed MCP or the like is employed as the detector 27. The present device configuration has an advantage of being superior to the 1st embodiment in the mass resolution and the mass accuracy of the detected ions.

Figure 13:
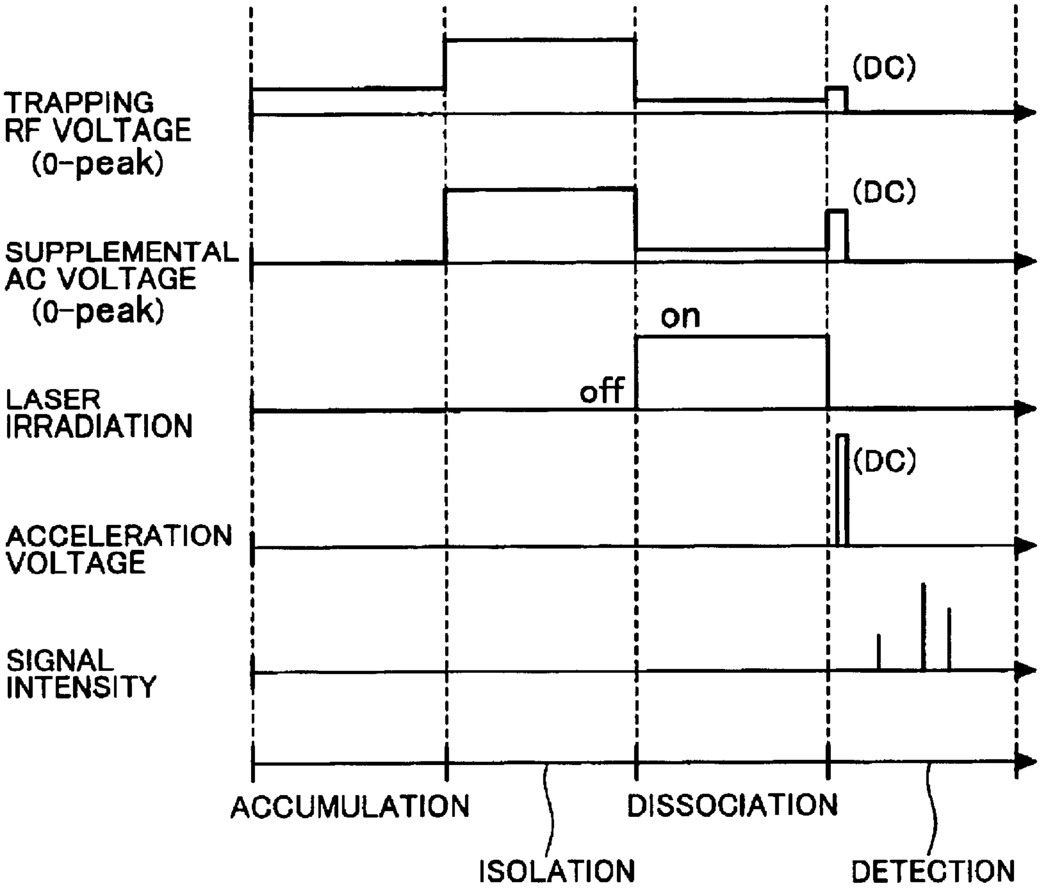
FIG. 13 illustrates measurement sequences in the 4th embodiment.

FIG. 13 illustrates the measurement sequences in this case. A controller 31 including a PC or the like performs the control over these measurement sequences. During the time-period of the ion trapping, a trapping RF voltage generated by a trapping RF voltage power-supply 33 continues to be applied to a ring electrode 8. During this time-period, the ions, which had been generated at an ion source and have passed through the respective components, are being stored into an ion trap. At the time of measuring positive ions, an about 100-V voltage is applied to an inlet gate electrode 6, and an about 100-V voltage is applied to a deflector 10. The former is applied so that the ions will be introduced into the ion trap with a high-efficiency, and the latter is applied so that the ions once introduced into the ion trap will not be ejected. The typical value of the ions' accumulation time is about 0.1 to 100 ms. If the accumulation time is too long, there occurs a phenomenon called "space charge of ions" within the ion trap. Since this phenomenon disturbs the electric field, the accumulation is terminated before this phenomenon appears. The efficiency with which the ions, which passed through the endcap electrodes and have reached the ion trap, will be trapped in a stable manner depends on the bath-gas pressure within the ion trap. An about 0.5 to 3-mTorr bath-gas pressure is a one at which the sensitivity and the resolution are satisfactory.

Next, the isolation of desired parent ions that are included in a desired mass range is performed. For example, an electric field, which is implemented by superposing radio frequency components resulting from excluding the resonance frequency of the desired parent ions, is applied between the endcap electrodes. This causes ions other than the desired parent ions to be ejected to the outside, thereby permitting only the ions, which are included in a (the) particular mass-number range, to remain within the ion trap. Although, in addition to this method, there exist a variety of ion isolation methods, an object that is common to all the methods is to cause only a certain range of parent ions to remain within the ion trap. The typical time-period needed for the ion isolation is about 5 to 20 ms.

Next, the dissociation of the isolated parent ions is performed. In the present scheme, a laser light is used for performing the dissociation. The typical laser power is about 10 to 30 W, and the power density thereof at this time is about 20 to 60 $W/mm^2$ (inaccurate because this is a calculated value). At this time, a voltage that resonates with the parent ions is applied between the endcap electrodes, thereby activating the dissociation. The typical time-period needed for the ion dissociation is about 5 to 100 ms.

After that, during the time-period of the ion detection, DC voltages are applied to the respective endcap electrodes 7, the ring electrode 8, and the deflector 10. As one example of the voltages at this time, about 30 V, about 10 V, and 0 V are applied to the entrance-side endcap electrode 7*a*, the exit-side endcap electrode 7*b*, and the deflector 10, respectively. Then, a several to a several tens of $\mu$s after, a several-kV pulse voltage is applied between the acceleration electrode (1) 40 and the acceleration electrode (2) 41, Although, here, the embodiment has been given where the ions are accelerated perpendicularly to the axis of the endcap electrodes, there also exists a method of accelerating the ions in the axis direction. In this case, by making the laser's incident direction opposite to the original direction on the coaxial axis, from inlet endcap electrode, it becomes possible to carry out the present invention.

Figure 14:
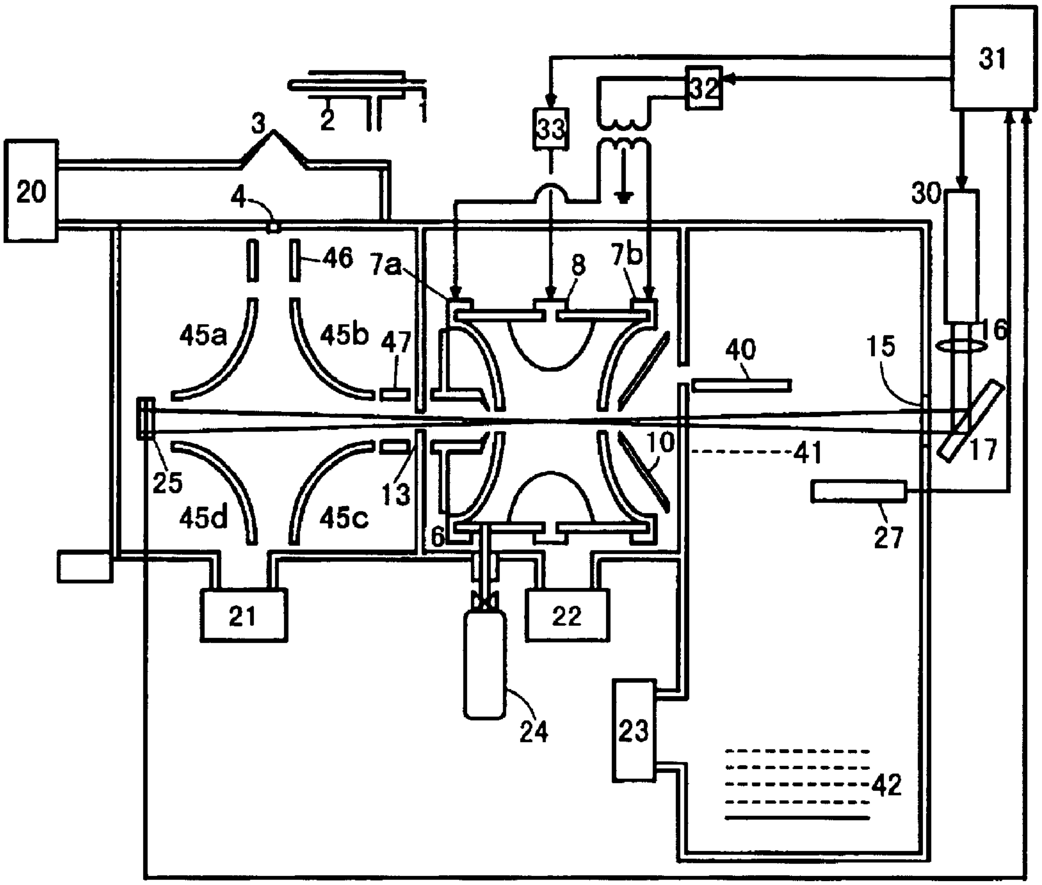
FIG. 14 illustrates a 5th embodiment of the present scheme.

In the above-described embodiment, in order to locate the detector used for the laser alignment, octapoles deflect the ion orbits. FIG. 14 discloses a different configuration for accomplishing this object. In the present configuration, quadrupole electrostatic lens 45 deflect, by 90°, the ions generated at the ion source. The employment of the quadrupole lens 45, as compared with that of the octapoles, presents a merit of being able to take a larger space between the electrodes through which the laser light passes.

In the embodiments explained so far, the case has been described where the $CO_2$ laser is employed. However, in the case of the other lasers, e.g., Nd-YAG laser, $N_2$ laser, and various types of semiconductor lasers, the present configuration also exhibits the similar effect of enhancing the dissociation efficiency.

There is provided the tandem mass spectrometry that, in the quadrupole ion trap, allows small mass-number product ions to be detected without lowering the sensitivity and the resolution.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A mass spectrometer, comprising:

an ion source;

an ion trap for accumulating ions generated by said ion source, said ion trap having a ring electrode and a pair of endcap electrodes each having an aperture;

a light irradiation device for irradiating said ions with a light, said ions being accumulated within said ion trap;

an ion detection device for detecting said ions ejected from said ion trap; and a device for controlling an application timing period of an alternating-current voltage between said endcap electrodes and an irradiation timing period of said light, wherein said light passes through apertures of said endcap electrodes so as to introduce said light into said ion trap along a central axis of said ion trap, and wherein the application timing period of said alternating-current voltage and the irradiation timing period of said light overlap with each other at least partially.

2. The mass spectrometer as claimed in claim 1, further comprising an optical window from which said light is launched in.

3. The mass spectrometer as claimed in claim 1, further comprising an optical-axis adjustment mechanism for adjusting an optical axis of said light during light irradiation.

4. A mass spectrometer, comprising:

an ion source;

an ion trap for accumulating ions generated by said ion source, for isolating parent ions from accumulated ions, for dissociating isolated ions, and for ejecting dissociated ions from said ion trap, said ion trap having a ring electrode and a pair of endcap electrodes each having an aperture;

an ion detection device for detecting said ions ejected from said ion trap;

a light irradiation device for irradiating the isolated ions with a light; and a device for controlling an application timing period of an alternating-current voltage between said endcap electrodes and an irradiation timing period of said light;

wherein optical axis of said light with which the isolated ions are irradiated passes through apertures of said endcap electrodes, along the central axis of said ion trap, and wherein the application timing period of said alternating-current voltage and the irradiation timing period of said light overlap with each other at least partially.

5. The mass spectrometer as claimed in claim 4, further comprising a light-gathering device provided on an optical pass extending between said light irradiation device and said apertures of said endcap electrodes.

6. The mass spectrometer as claimed in claim 4, wherein said light passes through the apertures of said endcap electrodes so as to introduce said light into said ion trap.

7. The mass spectrometer as claimed in claim 4, wherein said light passes through the apertures of said endcap electrodes so as to introduce said light into said ion trap, said light is irradiated from an aperture which is provided on an endcap electrode that exists on an ion-ejected side.

8. The mass spectrometer as claimed in claim 7, further comprising a photon detector serving as said optical-axis adjustment mechanism, said photon detector being provided on an optical axis of said light with which said ion trap is irradiated.

9. The mass spectrometer as claimed in claim 4, further comprising an atmospheric pressure ionization ion source serving as said ion source, and a time-of-flight mass spectrometer serving as said ion detection device.

10. The mass spectrometer as claimed in claim 4, further comprising a conversion dynode serving as said ion detection device.

11. The mass spectrometer as claimed in claim 10, further comprising a deflector for deflecting orbits of said ions ejected from said ion trap.

12. A mass analysis method, comprising the steps of:

accumulating ions within an ion trap having a ring electrode and a pair of endcap electrodes each having an aperture, said ions being generated from an ion source;

isolating a predetermined ion from accumulated ions;

dissociating an isolated ion; and performing mass analysis of a dissociated ion, wherein said ion dissociation step includes the steps of:

applying an alternating-current electric field to said isolated ion by applying an alternating-current voltage between said endcap electrodes; and irradiating said isolated ion with a light which passes through apertures of said endcap electrodes so as to introduce said light into said ion trap along a central axis of said ion trap, and wherein an application time-period of the alternating-current voltage and an irradiation time-period of the light irradiation overlap with each other at least partially.

* * * * *